July 2, 1968
R. J. MOORE
3,391,041
PROCESS OF MAKING A PLASTIC TUBE
BUNDLE FOR HEAT EXCHANGE
Filed Nov. 2, 1964
2 Sheets-Sheet 1
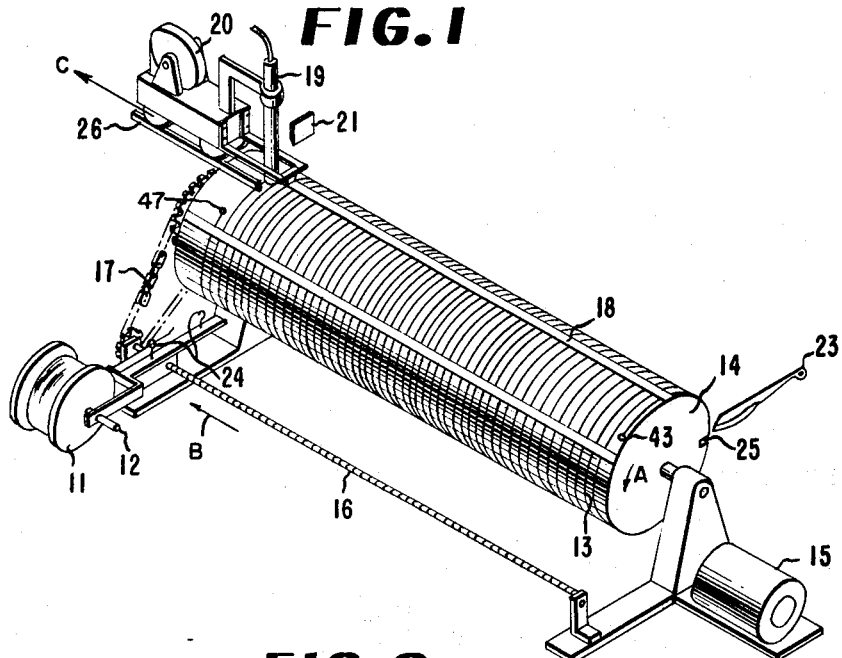
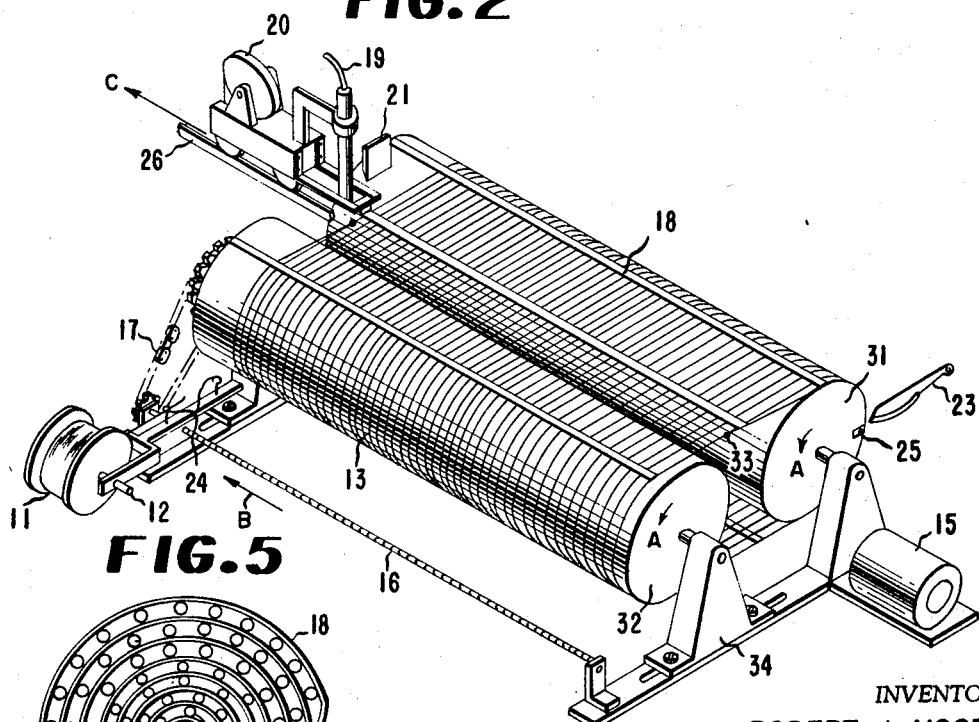
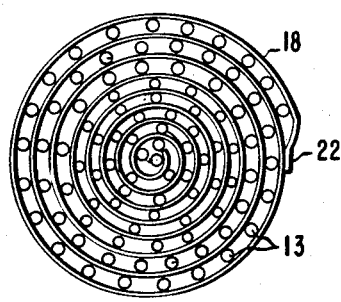
INVENTOR
ROBERT J. MOORE
BY Herbert M Wolfson
ATTORNEY July 2, 1968

R. J. MOORE 3,391,041

PROCESS OF MAKING A PLASTIC TUBE
BUNDLE FOR HEAT EXCHANGE

Filed Nov. 2, 1964

INVENTOR
ROBERT J. MOORE

BY Herbert M Wolfson
ATTORNEY

United States Patent Office 3,391,041
Patented July 2, 1968

3,391,041
PROCESS OF MAKING A PLASTIC TUBE BUNDLE
FOR HEAT EXCHANGE
Robert J. Moore, Newark, Del., assignor to E. I. du Pont de Nemours and Company, Wilmington, Del., a corporation of Delaware
Filed Nov. 2, 1964, Ser. No. 408,096
4 Claims. (Cl. 156—174)

ABSTRACT OF THE DISCLOSURE

A process for preparing a tube bundle that involves preparing a flat warp of spaced substantially parallel plastic tubes, the tubes being spaced by the use of at least one length of plastic tape bonded to the surfaces of the tubes, by winding at least one tube in a substantially helical pattern over at least one solid surface, applying the tape in a direction substantially perpendicular to the turns of the tube and then cutting the tubes in a path parallel to the tape; and then convolutely winding the tape of the warp about an axis parallel to an edge tube to form the bundle.

This invention relates to heat exchangers, and more particularly, to an improved process for preparing a bundle of plastic tubes for heat exchange use.

There are numerous industrial operations which require apparatus for transferring heat between fluid masses wherein at least one of the fluids is corrosive. Such operations include the cooling of hot corrosive acids, the use of polluted river water or brackish sea water for cooling where an adequate supply of good water is not available, the rapid heating or cooling of foodstuffs, etc.

The use of plastic tubes in a heat exchanger for such operations would seem to be a logical possibility. However, because such materials possess inherently low thermal conductivities, they must be used as small-diameter, thin-walled tubes. Such tubes are flexible and tend to be extremely sensitive to changes in temperature. Attempts to fabricate successfully such tubes into heat exchangers has been heretofore a virtually insurmountable task.

In application Ser. No. 389,109, filed Aug. 12, 1964 now U.S. Patent No. 3,277,959, and assigned to the assignee of the present application, is described a novel heat exchanger that is compact, light-weight, etc., yet has a heat transfer capacity comparable to an all-metal tube and shell heat exchanger. A process for converting tubular plastic materials, such as the polymers of fluorocarbons, amides, acetals, olefins, vinyl halides, styrene, etc. into the novel tube and shell heat exchanger is also described. Basically, the process described involves forming a tube bundle by first preparing a warp of parallel, hollow, polymeric filaments, the width of the warp being defined by its two edge filaments and bonding a plurality of spaced tapes, at least one of which tapes is disposed at an angle of 90 degrees to the filaments of the warp, the length of a tape that is disposed at an angle of 90 degrees to the warp being longer than the width of the warp to provide a trailing tab. Thereafter, by convolutely winding the tapes about an edge filament as the axis and bonding the trailing tab to the previous turn of the tape, the tube bundle is formed and can be used in the preparation of the heat exchanger.

It is an object of the present invention to provide a novel process for forming the aforementioned tube bundle. It is a further object to provide a process for forming a tube bundle that can employ a single, continuous hollow filament. Other objects will appear hereinafter.

The objects are accomplished by first forming a warp of hollow filaments by winding at least one continuous hollow filament in a substantially helical pattern over at least one solid surface to provide spaced turns of said filament about said surface, each turn of said filament about said surface, preferably, being substantially parallel to the other turns and substantially equidistant from adjacent turns, the length of a complete turn of said filament about said surface being equal to the length of the proposed warp and the total number of turns about said surface being equal to the number of individual filaments in said warp; bonding at least one length of tape, preferably a plurality of spaced tapes, to the surfaces of said turns of said wound continuous filament, said tape being disposed substantially perpendicular to said turns of said continuous filament and, preferably, extending beyond the final turn of said filament; cutting the turns of said filament in a path substantially parallel to said tape to provide a warp of substantially parallel, hollow filaments bonded by at least one tape, preferably by a plurality of spaced tapes. The warp is then convolutely wound in the manner described in U.S. patent application Ser. No. 389,109 now U.S. Patent 3,277,959 to form the tube bundle.

One process falling within the scope of the above described process involved affixing one end of a continuous hollow filament to the surface of a substantially cylindrical drum, and winding said filament in a constant-pitch, helical pattern on the surface of said drum, the circumference of said cylindrical drum being equal to the length of the warp and the number of turns of the helix being equal to the number of filaments desired in the warp; bonding at least one length of tape to the filament helix, the length of said at least one tape being substantially parallel to the axis of the cylinder and, preferably, extending beyond the outermost portion of the helix; cutting the helix in a path substantially parallel to the axis of the cylinder; and, thereafter, removing the warp of filaments and the tapes bonded thereto from the cylinder.

Another process utilizes a pair of substantially cylindrical drums. In this process, a single continuous hollow filament is wound substantially helically over the outer surface of the pair of rotatable cylinders in the manner described above. However, since the filament cannot be in contact with a rotating surface at all times, the first turn of the filament about the surface of the two cylinders is bonded to itself before starting the second turn of the filament. By driving at least one of the rotatable cylindrical drums and traversing the filament supply, the hollow filament may be caused to encircle both cylinders in a manner such that a modified helix having the number of turns equal to the number of filaments desired in the warp, the length of a complete turn being equal to the length of the warp, can be formed. Thereafter, at least one length of tape is applied to the helix; the helix is cut in a path substantially parallel to the axis of the helix and the tapes and filaments are removed from the cylinders.

Still another process utilizes the rotation of a flat central core plate for winding a filament in a manner to provide the flat warp of filaments that is obtained by the previously described methods. By using a rotatable core plate or similar surface in conjunction with a spacer tape supply, the spacing of tapes and hollow filaments remains as flexible as when a cylindrical drum is used. However, a flat plate is usually less expensive than a cylindrical drum. Furthermore, a flat plate can be constructed in extendible segments so that the length of a complete turn of the filament can be easily varied.

The invention will be more clearly understood by referring to the drawing in which:

FIGURE 1 is a schematic illustration of apparatus for carrying out one process within the scope of this invention;

FIGURE 2 is a schematic illustration of another apparatus for carrying out a process within the scope of this invention;

FIGURE 5 is a sectional end view of the tube bundle formed by coiling the warp sheet shown in FIGURE 4.

Figure 3:
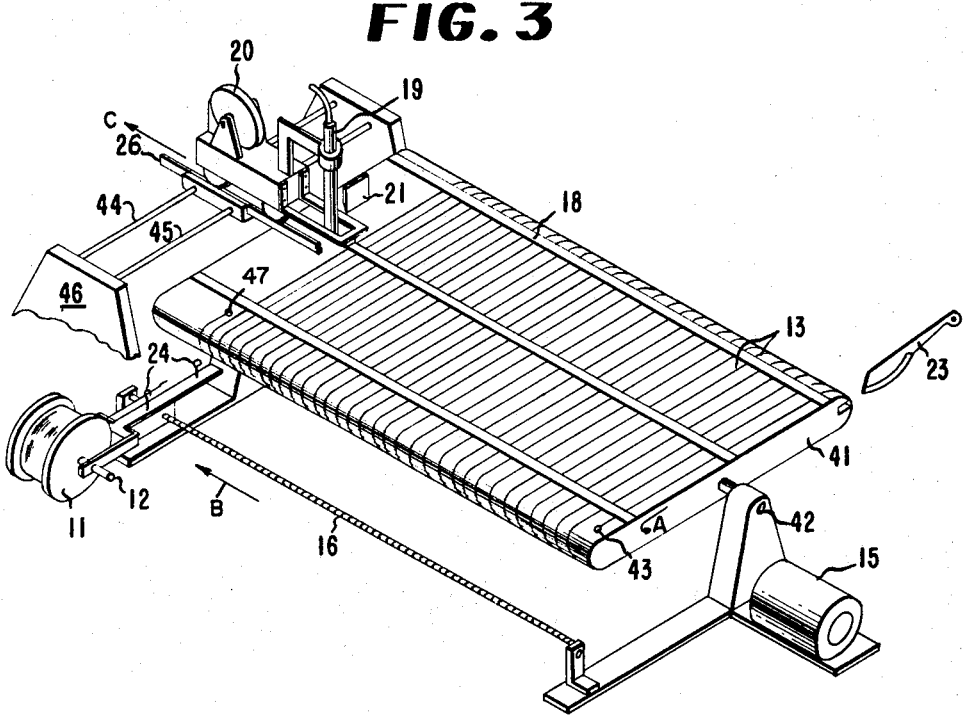
FIGURE 3 is a schematic illustration of another apparatus for carrying out a process within the scope of this invention.

In the process carried out using the apparatus illustrated in FIGURE 1, a spool 11 containing a continuously wound length of the hollow filament is used. The hollow filament is preferably composed of a fluorocarbon polymeric material and may be anywhere from 0.08 inch to 0.25 inch in outside diameter with a wall thickness that is from 5% to 15% of the outside diameter. The spool 11 is rotatably mounted on mandrel 12. A length of the filament 13 is unwound and anchored tangentially to the surface of or inserted in hole 43 in the cylindrical drum 14. The drum 14 is rotated by using motor means such as 15. As drum 14 is rotated in the direction shown by the arrow A, the hollow filament 13 is unwound from spool 11, guided through the guides 24 on lead screw 16 and is wrapped about the cylindrical drum 14. The lead screw 16 is driven through a chain and sprocket arrangement shown at 17, which arrangement is synchronized with the rotation of the drum 14 to provide a preset spacing between windings of the hollow filament on the drum as the spool assembly moves in the direction shown by the arrow B. When the desired number of turns have been wound on the cylindrical drum 14, the motor is stopped, and the trailing end of this filament is cut and anchored to drum 14 at 47. Thereafter, tape spool 20 along with hot air gun 19 are traversed in the support 26 in the direction shown by the arrow C to unwind and weld tapes 18 to the surfaces of the turns of the hollow filament 13 in a direction substantially perpendicular to the turns of the filament, the hot air from gun 19 serving to melt the surfaces of tape and filament to effect a weld. In order to apply additional lengths of tape, the drum 14 may be rotated and the tape spool and hot air gun 19 traversed each time in the manner previously described. Alternatively, a plurality of tape spools 20 and hot air guns 19 may be used to apply a plurality of tapes simultaneously.

Figure 4:
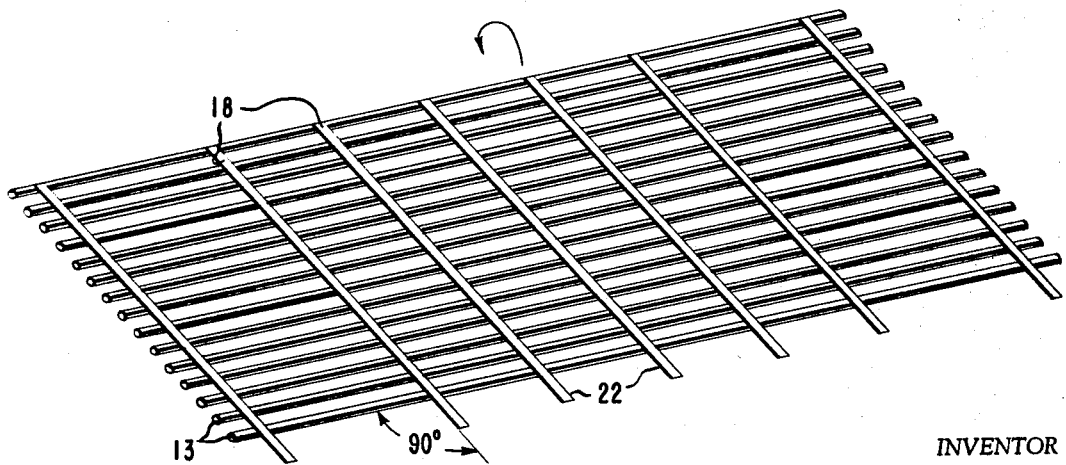
FIGURE 4 is a layout view of the warp sheet produced by any of the processes described and prior to coiling to form the tube bundle.

The tapes 18 may be composed of any material, but are preferably composed of the identical fluorocarbon polymeric material as the filaments. The tapes are usually about 0.010 inch thick and ⅜ to ½ inch wide. Although localized heat bonding is shown in the drawing, any suitable adhesive or solvent bonding technique may be employed. After bonding the tapes 18 to the surfaces of the turns of the hollow filament, cut-off knife 21 severs the tapes 18 in a manner to provide a trailing tape tab 22. Cut-off knife 23 is caused to move in the groove 25 in the cylindrical drum 14 to sever the turns of the hollow filament in a path substantially parallel to the tapes 18 to provide the warp sheet. The warp sheet, as shown in FIGURE 4, consists of the substantially parallel hollow filaments 13 having the spacers 18 bonded to their surfaces in the manner shown. In a separate device or by hand, the warp sheet is convolutely wound, tape-side out, to provide the tube bundle shown in the end view in FIGURE 5.

In the process carried out using the apparatus of FIGURE 2, a similar supply spool 11 for the hollow filament is used as in FIGURE 1. However, in this arrangement two rotatable, substantially parallel, cylindrical drums 31 and 32 are used. Only one of said drums need be driven. The drums are mounted in a support 34. The support is adapted to permit the space between the drums to be adjusted. In this manner, the length of the proposed warp is not dependent on the diameter of available drums. Instead, the length of the warp can be increased by merely setting the two drums further apart. After unwinding a single turn of the hollow filament about the two drums, the filament is affixed at 33 to itself. Thereafter, the operation is substantially as described for FIGURE 1. Specifically, the continuous hollow filament is wound in a substantially constant-pitch, helical pattern over the surfaces of the two drums 31 and 32. The circumferential length of a single turn of the filaments equals the length of the proposed warp and the number of substantially helical turns equals the number of individual final filaments in the warp. After the desired number of turns have been obtained, the trailing end of the filament is cut and affixed to the previous turn of the filament. The flat polymeric spacer tapes 18 are bonded to the hollow filament coils in paths parallel to the axes of the drums by traversing the tape spool 20 along with welding gun 19 to unwind and weld tapes 18 to the surfaces of the coils. Additional tapes may be applied by translating the warp and repeating the spool and gun traversing procedure. Then, by cutting the tapes using cut-off knife 21 followed by cutting the modified helix assembly parallel to the axes of the drums with knife 23, the cylindrical warp is released and permitted to unwrap. A flat warp of substantially evenly positioned parallel filaments as shown in FIGURE 4 is the result.

In the process carried out using the apparatus of FIGURE 3, a central core plate, which may be a substantially flat board, is mounted and affixed to a rotatable rod 42. This arrangement is used in place of the cylindrical drum shown in FIGURE 1. In all other respects, the operation is identical to that described for FIGURE 1. Specifically, the hollow filament 13 is unwound from the supply spool 11, threaded through the guide 24, and anchored to the core plate 41 by insertion in hole 43. Core plate 41 is then rotated and the guide 24 traversed in a pre-set manner to lay down the spaced turns of the filament 13 about the surface of the core plate 41. When the desired number of turns have been wound on the plate 41, rotation is stopped, the plate assembly is locked in the horizontal position, and the trailing end of the filament is cut and anchored to plate 41. Spacer tapes 18 are unwound from spool 20 and placed over the surfaces of the turns of the hollow filament in a direction substantially perpendicular to the turns of the filament as welding gun 19 bonds the tapes 18 to the surfaces of the turns of the filament in the manner assembled for FIGURE 1. Support 26 is horizontally translatable in rods 44 and 45 which are mounted on support 46. After bonding, knives 21 and 23 are operated in sequence as in the previously-described processes to provide the warp sheet.

After the warp of substantially evenly spaced, parallel filaments is formed, it is tightly rolled or convolutely wound by hand or mechanically about an axis parallel to an edge filament, with or without the use of a removable mandrel, to provide the tube bundle shown in FIGURE 5. In winding, the tapes are wound preferably in a manner that places them on the outside of the filament bundle, usually in pattern on themselves, but separated by the diameter of the hollow filaments. When coiling is completed, the trailing tape tabs or ends are each welded or otherwise bonded to their preceding coils, thereby restraining the bundle of filaments in a substantially cylindrical (cross-section) pattern and forming a semirigid structure which is essentially self-supporting.

The ends of the tube bundle may then be gathered into a fluid-tight arrangement while maintaining the openings in the hollow filaments by any method. One method is disclosed in U.S. Patent No. 3,315,740.

What is claimed is:

1. A process for preparing a tube bundle which comprises the steps, in sequence, of forming a flat warp of spaced, substantially parallel, hollow plastic filaments by winding at least one continuous hollow plastic filament in a substantially helical pattern over at least one solid surface to provide spaced turns of said filament about said surface, the length of a complete turn of said filament about said surface being equal to the length of said warp and the total number of turns about said surface being equal to the number of individual filaments in said warp; bonding at least one length of a plastic tape to the surfaces of said turns of said filament, said tape being disposed substantially perpendicular to said turns of said filament; cutting the turns of said filament in a single straight path substantially parallel to said tape to form said warp of spaced, substantially parallel, hollow filaments; convolutely winding said tape about an axis parallel to an edge filament to form a tube bundle wherein said tape spaces said filaments from each other to provide interstices between said filaments.

2. A process as in claim 1 wherein said solid surface is a substantially cylindrical drum which is rotated in a manner adapted to wind said hollow filament in a substantially constant-pitch, helical pattern.

3. A process as in claim 1 wherein two spaced-apart cylindrical drums are used, the space between drums being adjustable, said drums being adapted to wind said hollow filament in a substantially helical constant-pitch pattern, the first turn of said filament being affixed to itself prior to winding.

4. A process as in claim 1 wherein said solid surface is a substantially flat core plate adapted to wind said hollow filament in a constant-pitch, modified helical pattern.

References Cited

UNITED STATES PATENTS

| | | | |
|---|---|---|---|
| 3,215,029 | 11/1965 | Woodcock | 156—174 XR |
| 3,104,191 | 9/1963 | Hicks et al. | 156—174 |
| 3,303,075 | 2/1967 | Rabus | 156—297 XR |
| 3,080,268 | 3/1963 | Bjork | 156—297 XR |

EARL M. BERGERT, *Primary Examiner.*

PHILIP DIER, *Examiner.*